United States Patent
Mijolovic et al.

(10) Patent No.: US 8,247,467 B2
(45) Date of Patent: Aug. 21, 2012

(54) PROCESS FOR PRODUCING FLEXIBLE POLYURETHANE FOAMS

(75) Inventors: Darijo Mijolovic, Mannheim (DE); Stephan Bauer, Ostercappeln (DE); Stephan Goettke, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 259 days.

(21) Appl. No.: 12/513,506

(22) PCT Filed: Nov. 9, 2007

(86) PCT No.: PCT/EP2007/062143
§ 371 (c)(1),
(2), (4) Date: May 5, 2009

(87) PCT Pub. No.: WO2008/058913
PCT Pub. Date: May 22, 2008

(65) Prior Publication Data
US 2009/0306239 A1     Dec. 10, 2009

(30) Foreign Application Priority Data
Nov. 15, 2006   (EP) .................................. 06124124

(51) Int. Cl.
*C08G 18/28* (2006.01)
(52) U.S. Cl. ........ 521/172; 521/130; 521/157; 521/173; 521/174; 521/178; 521/179; 428/423.1
(58) Field of Classification Search .................. 521/172, 521/178, 130, 157, 173, 174, 179; 428/423.1
See application file for complete search history.

(56) References Cited

U.S. PATENT DOCUMENTS

| | | | |
|---|---|---|---|
| 4,634,743 A | 1/1987 | Prier | |
| 4,713,399 A | 12/1987 | Webb et al. | |
| 4,826,887 A | 5/1989 | Kuyper et al. | |
| 4,826,952 A | 5/1989 | Kuyper et al. | |
| 4,826,953 A | 5/1989 | Kuyper et al. | |
| 7,268,204 B2 * | 9/2007 | Hinz et al. | 528/412 |
| 2001/0004647 A1 | 6/2001 | Haas et al. | |
| 2003/0149232 A1 | 8/2003 | Hinz et al. | |
| 2006/0223973 A1 * | 10/2006 | Hinz et al. | 528/196 |

FOREIGN PATENT DOCUMENTS

| | | |
|---|---|---|
| CN | 1400229 | 3/2003 |
| EP | 0 222 453 | 5/1987 |
| EP | 1 108 736 | 6/2001 |
| WO | 00/78337 | 12/2000 |

OTHER PUBLICATIONS

U.S. Appl. No. 13/061,743, filed Mar. 2, 2011, Mijolovic, et al.

* cited by examiner

*Primary Examiner* — John Cooney
(74) *Attorney, Agent, or Firm* — Oblon, Spivak, McClelland, Maier & Neustadt, L.L.P.

(57) ABSTRACT

The invention relates to a process for producing flexible polyurethane foams by reacting
a) polyisocyanates with
b) compounds having at least two hydrogen atoms which are reactive toward isocyanate groups in the presence of
c) blowing agents,
wherein the component b) comprises at least one polyether carbonate polyol bi) which can be prepared by addition of carbon dioxide and alkylene oxides onto H-functional starter substances using DMC catalysts and has a functionality of at least 2, a hydroxyl number in the range from 10 to 500 mg KOH/g and a content of incorporated carbon dioxide in the form of carbonate units of at least 2% by weight.

20 Claims, No Drawings

PROCESS FOR PRODUCING FLEXIBLE POLYURETHANE FOAMS

CROSS REFERENCE TO RELATED APPLICATION

This application is a 371 of PCT/EP07/062143, filed on Nov. 9, 2007, and claims priority to European Patent Application No. 06124124.6, filed on Nov. 15, 2006.

The invention relates to a process for producing flexible polyurethane foams which should have, in particular, reduced emission of organic substances and a good flame lamination capability.

Flexible polyurethane foams are used in many industrial fields, in particular for upholstery or noise insulation. They are usually produced by reacting polyisocyanates with compounds having at least two hydrogen atoms which are reactive toward isocyanate groups in the presence of blowing agents and, if appropriate, catalysts and customary auxiliaries and/or additives.

Most polyurethane foams emit volatile organic compounds. These can be, for example, catalysts, degradation products or unreacted volatile starting materials. These emissions are considered to be a quality defect for many fields of use of the flexible polyurethane foams, for example when they are used in motor vehicle interiors or in furniture or mattresses.

The market is therefore increasingly demanding low-emission foams. The automobile industry in particular will in the coming years demand a significant reduction in volatile organic compounds (VOC) and condensable compounds (fogging or FOG) in foams.

There have in the past been many attempts to reduce the emission tendency of flexible polyurethane foams.

In the automobile industry, it is necessary for many fields of use to apply flame-laminated layers to the foams. Flame lamination is carried out using, in particular, flexible polyester slabstock foams, especially foams based on low-fogging polyesterols as are marketed, for example, under the name Lupraphen® 8149 by BASF Aktiengesellschaft. Disadvantages of this class of foams is that, firstly, cyclic compounds derived from diethylene glycol and adipic acid are always still found in the emission measurements and that the aging properties of polyester slabstock foams do not meet customer requirements.

Polyether slabstock foams can likewise be used for flame lamination when additives are employed. Polyetherols have the advantage over polyesterols of better aging properties, but the adhesion between foam and textile is frequently unsatisfactory.

In the future, it is to be expected that the overall emission limits in automobile construction will be significantly reduced and emission of amines will no longer be accepted, without there being allowed to be decreases in the quality of the polyurethanes. Furthermore, fogging is to be minimized in the case of polyurethanes in motor vehicle interiors. The term fogging refers to the emission of compounds which can subsequently condense in the vehicle interior, for example on the windshield. Fogging, too, is considered to be a quality defect.

The emissions are measured in accordance with VDA 278. The following limit values are required by the market: 1. volatile emissions (VOC) of not more than 100 ppm and 2. condensable emissions (FOG) of not more than 250 ppm.

It is an object of the invention to provide a polyurethane slabstock foam having acceptable adhesion properties in flame lamination, good aging properties and a minimum of emissions.

This object has been achieved by the use of polyols prepared by polyaddition of alkylene oxides and carbon dioxide onto H-functional starter substances in the presence of DMC catalysts for producing flexible polyurethane foams.

The invention accordingly provides a process for producing flexible polyurethane foams by reacting
a) polyisocyanates with
b) compounds having at least two hydrogen atoms which are reactive toward isocyanate groups in the presence of
c) blowing agents,
wherein the component b) comprises at least one polyether carbonate polyol bi) which can be prepared by addition of carbon dioxide and alkylene oxides onto H-functional starter substances using DMC catalysts and has a functionality of at least 2, a hydroxyl number in the range from 10 to 500 mg KOH/g and a content of incorporated carbon dioxide in the form of carbonate units of at least 2% by weight.

Here, the content of incorporated carbon dioxide is based on the part of the molecule of the respective polyether carbonate polyol bi) which is built up by the reaction without the starter substance.

As regards the polyether carbonate polyols bi) used according to the invention and their preparation, the following may be said:

The polyether carbonate polyols bi) are usually prepared by catalytic addition of alkylene oxides and carbon dioxide onto H-functional starter substances.

As alkylene oxides, it is possible to use pure alkylene oxides, mixtures of alkylene oxides or mixtures of oxides of industrially available raffinate streams. In general, alkylene oxides having from 2 to 24 carbon atoms can be used for the process of the invention. The following compounds may be mentioned by way of example: ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide. In a particular embodiment of the invention, monoepoxidized or multiply epoxidized fats and oils as monoglycerides, diglycerides and triglycerides or epoxidized fatty acids or their $C_1$-$C_{24}$-esters can be used as alkylene oxides. In a further particular embodiment, epichlorohydrin, glycidol or derivatives of glycidol, for example methyl glycidyl ether, ethyl glycidyl ether, allyl glycidyl ether, can be used as alkylene oxides. In particular, ethylene oxide and/or propylene oxide, especially propylene oxide, are used as alkylene oxides for preparing polyether carbonate polyols bi) according to the invention.

The polyether carbonate polyols bi) used according to the invention have, as described, a functionality of at least 2, preferably from 2 to 8, particularly preferably from 2 to 4 and in particular from 2 to 3, and a hydroxyl number in the range from 10 to 500 mg KOH/g.

To prepare the polyether carbonate polyols bi) used according to the invention, alkylene oxides and carbon dioxide are added onto H-functional starter substances. As suitable starter substances, it is possible to use all compounds having H atoms which are active in respect of alkoxylation. Groups having active H atoms which are active in alkoxylation are —OH, —NH, —SH and CO₂H, preferably —OH and —NH, in particular —OH. As suitable starter substances, it is possible to use, for example, polyhydric alcohols, polyfunctional amines, polyhydric thiols, polyfunctional amino alcohols, polyfunctional thioalcohols, polyether polyols, polyester polyols, polyester ether polyols, polycarbonate polyols, polyethylenimines, hyperbranched polyglycerols, hyperbranched polycarbonate polyols, hyperbranched polyester polyols, hyperbranched polyurethane polyols, PolyTHF®, polyetheramines (e.g. Jeffamines, BASF products polyetheramine D230, D400, D200, T403, T5000), polytetrahydrofuran amines (BASF product polytetrahydrofuran amine 1700), polyether thiols and polyacrylatols. In a particular embodiment, castor oil, the monoglyceride or diglyceride of ricinoleic acid or monoglycerides of fatty acids can be used as starter substances. Furthermore, it is possible to use chemically modified monoglycerides, diglycerides, triglycerides of fatty acids or $C_1$-$C_{24}$-alkyl fatty acid esters in which an average of at least 2 OH groups per molecule have been introduced chemically. The chemical modifications for introducing OH groups into fats, oils and derivatives thereof are known to those skilled in the art. Examples of chemical modifications for introducing OH groups on monoglycerides, diglycerides, triglycerides or $C_1$-$C_{24}$-alkyl fatty acid esters are the ring opening of epoxidized fat and oil derivatives, as are described in, for example, DE 27 11 002, or the hydroformylation of fat and oil derivatives, as are described in WO 2004/096882 or WO 2004/096883, or other modifications as are described in WO 2004/020497, US 2003/143910 or US 2003/191274. Examples which may be mentioned here are Lupranol Balances (BASF AG), Merginol® grades (Hobum Oleochemicals GmbH), Sovermol® grades (Cognis Deutschland GmbH & Co. KG) and Soyol™ grades (USSC Co.). All of the compounds mentioned can be used as starter substances either as single substances or as mixtures of at least 2 of the compounds mentioned.

Polyhydric alcohols suitable as starter substances are, for example: dihydric alcohols such as ethylene glycol, diethylene glycol, propylene glycol, dipropylene glycol, 1,3-propanediol, 1,4-butanediol, 1,5-pentanediol, 1,6-hexanediol; trihydric alcohols: trimethylolpropane, glycerol, castor oil; tetrahydric alcohols: pentaerythritol; polyalcohols: sorbitol, hexitol, sucrose, starch, starch hydrolysates, cellulose, cellulose hydrolysates, hydroxy-functionalized fats and oils, in particular castor oil. As starter substances for the preparation according to the invention of polyether carbonate polyols bi), particular preference is given to using alcohols having functionalities of from 2 to 8 either as single substance or as a mixtures of at least 2 of the alcohols mentioned. Bifunctional and/or trifunctional alcohols are preferably used as starter substances. When hydroxy-functionalized fats and oils, in particular castor oil, are used as starter substances, it is possible to incorporate a larger amount of carbon dioxide into the polyether carbonate polyol chain.

Polyfunctional amines suitable as starter substances are, for example: ammonia, methylamine, ethylamine, straight-chain or branched $C_3$-$C_{18}$-monoamines, ethylenediamine, triethylenetetramine, tetraethylenepentamine, propylenediamine, polyethylenimines having $M_{we}$=300 to 5000 g/mol, isomers of toluenediamine, polyetheramines such as Jeffamines or isomers of diaminodiphenylmethane. Preference is given to ethylenediamine and the isomers of toluenediamine.

The starter substances can also be selected from the class of polyether polyols, in particular those having a molecular weight Mr in the range from 62 to 10 000 g/mol. As polyether polyols, use is made of at least 2-functional, preferably from 2- to 8-functional, particularly preferably 2- and 3-functional polyether polyols. Preference is given to polyether polyols which are made up of repeating ethylene oxide and propylene oxide units, preferably with a proportion of propylene oxide units of from 35 to 100%, particularly preferably with a proportion of propylene oxide units of from 50 to 100%. These can be random copolymers, gradated copolymers, alternating copolymers or block copolymers of ethylene oxide and propylene oxide. Suitable polyether polyols made up of repeating propylene oxide and/or ethylene oxide units are, for example, the Lupranol® grades from BASF AG. Further suitable homopolyethylene oxides are, for example, the Pluriol® E grades from BASF AG, suitable homopolypropylene oxides are, for example, the Pluriol® P grades from BASF AG and suitable mixed copolymers of ethylene oxide and propylene oxide are, for example, the Pluriol® PE or Pluriol® RPE grades from BASF AG.

The starter substances can also be selected from the class of polyester polyols, in particular those having a molecular weight $M_n$ in the range from 200 to 10 000 g/mol. As polyester polyols, use is made of at least 2-functional polyester polyols. Polyester polyols preferably comprise alternating acid and alcohol units. As acid components, preference is given to using succinic acid, adipic acid, phthalic anhydride, phthalic acid or mixtures of the acids and/or anhydrides mentioned. Alcohol components used are ethanediol, 1,2-propanediol, 1,3-propanediol, 1-4-butanediol, 1,5-pentanediol, 1,6-hexanediol, diethylene glycol, dipropylene glycol or mixtures of the alcohols mentioned. If dihydric or polyhydric polyether polyols are used as alcohol component, these result in polyester ether polyols which can likewise serve as starter substances for preparing the polyether carbonate polyols bi). Preference is given to using polyether polyols having $M_n$=150 to 2000 g/mol for preparing the polyester ether polyols. Unless indicated otherwise, the molecular weights of the polyols are the number average molecular $M_n$.

Further starter substances which can be used are polycarbonates, in particular those which have a molecular weight $M_n$ in the range from 150 to 10 000 g/mol and are prepared, for example by reaction of phosgene, dimethyl carbonate, diethyl carbonate or diphenyl carbonate and 2-functional alcohols or polyester polyols or polyether polyols. Examples of polycarbonates may be found, for example, in the patent application EP 1 359 177.

Preference is given to using diethylene glycol, dipropylene glycol, glycerol, trimethylolpropane, pentaerythritol, castor oil, sorbitol, glycerol and polyether polyols made up of repeating polyalkylene oxide units as H-functional starter substances. Diethylene glycol, dipropylene glycol, glycerol, trimethylolpropane, 2- to 4-functional polyether polyols made up of propylene oxide or of propylene oxide and ethylene oxide are particularly preferred. The polyether polyols preferably have a molecular weight $M_n$ in the range from 62 to 10 000 g/mol, a functionality of from 2 to 4 and a viscosity of from 200 to 10 000 mPa·s, and in particular a molecular weight $M_n$ in the range from 62 to 5000 g/mol, a functionality of from 2 to 3 and a viscosity of from 300 to 2000 mPa·s. The preferred starter substances are used either as single substance or as a mixture of at least 2 of the substances mentioned.

The polyether carbonate polyols bi) are prepared by catalytic addition of carbon dioxide and alkylene oxides onto starter substances having H atoms which are active in respect of alkoxylation. Catalysts used are multimetal cyanide compounds, also referred as DMC catalysts. As alkylene oxides, preference is given to using, as described, ethylene oxide and propylene oxide either as single substances or as a mixture. The polyether carbonate polyols bi) preferably comprise from 2 to 25% by weight of carbon dioxide in the form of carbonate units, from 0 to 40% by weight of ethylene oxide and from 35 to 98% by weight of propylene oxide. Here, the respective figures refer to the part of the molecule of the respective polyether carbonate polyol bi) built up by the reaction without the starter substance. Very particular preference is given to using exclusively propylene oxide as alkylene oxide. The polyether carbonate polyols bi) prepared then very particularly preferably comprise from 2 to 25% by weight of carbon dioxide in the form of carbonate units and from 75 to 98% by weight of propylene oxide, based on the part of the molecule of the respective polyether carbonate polyol bi) built up by the reaction without the starter substance.

The polyether carbonate polyols bi) described according to the invention preferably have a structure which can be described by the general formula (I):

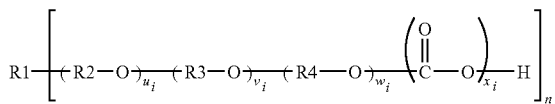

(I)

where
R1 is a starter substance radical without the H atoms which are active in respect of alkylation, for example molecular radicals of polyhydric alcohols, polyfunctional amines, polyhydric thiols, polyfunctional amino alcohols, polyhydric thioalcohols, polyetherols, polyesterols, polyester etherols, polycarbonates, polyethylenimines, hyperbranched polyglycerols, hyperbranched polycarbonate polyols, hyperbranched polyesterols, hyperbranched polyurethane polyols, PolyTHF®, polyetheramines (i.e. Jeffamines, BASF products polyetheramine D230, D400, D200, T403, T5000), polytetrahydrofuran amines (BASF product polytetrahydrofuran amine 1700), polyether thiols, polyacrylatols; also the molecular radical of castor oil, monoglycerides or diglycerides of castor oil, monoglycerides of fatty acids, monoglycerides, diglycerides, triglycerides or $C_1$-$C_{24}$-alkyl fatty acid esters having at least 2 O atoms of hydroxyl groups, whose hydroxyl groups have been introduced beforehand by chemical modification known to those skilled in the art;
R2 is $CH_2$—$CH_2$,
R3 is $CH_2$—$CH(CH_3)$,
R4 is $CH_2$—$CH(R5)$, $CH(R6)$—$CH(R6)$, $CH_2$—$C(R6)_2$, $C(R6)_2$—$C(R6)_2$,

$CH2$—$CH$—$CH_2$—$R8$, $C_6H_6$—$CH$—$CH_2$, $C_6H_6$—$C(CH_3)$—$CH_2$, molecular radical of monoepoxidized or multiply epoxidized fats or oils as monoglycerides, diglycerides and triglycerides, molecular radical of mono-expoxidized or multiply epoxidized fatty acids or their $C_1$-$C_{24}$-alkyl esters,
R5 is a $C_2$-$C_{24}$-alkyl radical, alkene radical which may be linear or branched,
R6 is a $C_1$-$C_{24}$-alkyl radical, alkene radical which may be linear or branched,
R7 is a $C_3$-$C_6$-alkyl radical which is arranged linearly,
R8 is OH, Cl, $OCH_3$, $OCH_2$—$CH_3$, O—$CH_2$—$CH$=$CH_2$, O—$CH$=$CH_2$.

A person skilled in the art will know that reaction of alkylene oxides which have a further group which is reactive in respect of alkoxylation can give rise to branching points within the polymer chain. Thus, when glycidol is used as alkylene oxide, the OH group of the glycidol can produce a further polymer chain onto which alkylene oxide units can add. A similar situation applies when using multiply epoxidized fat or oil derivatives.

Furthermore, $u_i$, $v_i$, $w_i$ are integers of 0-400; with at least one of the indices $u_i$, $v_i$ or $w_i$ being $\geq 1$;

$x_i$ is an integer from 1 to 100, where, in addition, neither —C(=O)—O—C(=O)—O— bonds (carbonate-carbonate bond) occur nor a —C(=O)—OH bond occurs at the end of the chain in polyether carbonate polyols bi) of the general formula (I);

n is an integer from 2 to 100, preferably from 2 to 8, particularly preferably from 2 to 4, in particular 2 or 3;

i is an integer from 1 to n.

Furthermore, the following relationships preferably apply in the general formula (I):

$$\frac{1}{n} * \sum_{i=1}^{n} \frac{x_i}{u_i + v_i + w_i + x_i} = 0.02 \text{ to } 0.25$$

$$\frac{1}{n} * \sum_{i=1}^{n} \frac{u_i}{u_i + v_i + w_i + x_i} = 0 \text{ to } 0.4$$

$$\frac{1}{n} * \sum_{i=1}^{n} \frac{v_i}{u_i + v_i + w_i + x_i} = 0 \text{ to } 0.98$$

$$\frac{1}{n} * \sum_{i=1}^{n} \frac{w_i}{u_i + v_i + w_i + x_i} = 0 \text{ to } 0.4$$

The monomer building blocks can be present in any order in the individual polymer chains 1 to n, but neither —C(=O)—O—C(=O)—O— bonds (carbonate-carbonate bond) occur within the polymer chains nor —C(=O)—OH bonds occur at the chain end of individual polymer chains. In addition, the n polymer chains of the polyether carbonate polyol bi) can have compositions which are independent of one another. Furthermore, it is possible for not all or only one of the n polymer chains to grow by means of alkoxylation during the addition reaction.

If mixtures of starter substances are used, then different structures of polyether carbonate polyols bi) of the general formula (I) can be present side by side.

If u, v, w≠0, or u, v≠0 and at the same time w=0 in the general formula (I), then the individual building blocks (R2—O), (R3—O) and (R4—O) or (R2-O) and (R3—O) can, independently of C(=O)—O units, be bound to one another either in the form of blocks, strictly alternating, randomly or in the form of gradients.

Preference is given to polyether carbonate polyols bi) made up of starter substances, ethylene oxide, propylene oxide and $CO_2$. These can be described by the general formula (II),

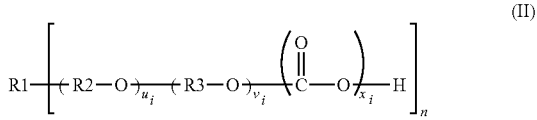
(II)

where R1, R2 and R3 are as defined in formula (I) and
$u_i$, $v_i$ are integers of 0-400; with at least $u_i$, or $v_i$ being $\geqq 1$;
$x_i$ is an integer from 1 to 100, where, in addition, neither —C(=O)—O—C(=O)—O— bonds (carbonate-carbonate bond) occur nor a —C(=O)—OH bond occurs at the end of the chain in polyether carbonate polyols bi) of the general formula (II);
n is an integer from 2 to 100, preferably from 2 to 8, particularly preferably from 2 to 4, in particular 2 or 3;
i is an integer from 1 to n.

Furthermore, the following relationships preferably apply to the general formula (II):

$$\frac{1}{n} * \sum_{i=1}^{n} \frac{x_i}{u_i + v_i + x_i} = 0.02 \text{ to } 0.25$$

$$\frac{1}{n} * \sum_{i=1}^{n} \frac{u_i}{u_i + v_i + x_i} = 0 \text{ to } 0.4$$

$$\frac{1}{n} * \sum_{i=1}^{n} \frac{v_i}{u_i + v_i + x_i} = 0.35 \text{ to } 0.98.$$

The monomer building blocks can be present in any order in the individual polymer chains 1 to n, but neither —C(=O)—O—C(=O)—O— bonds (carbonate-carbonate bond) occur within the polymer chains nor —C(=O)—OH bonds occur at the chain end of individual polymer chains. In addition, the n polymer chains of the polyether carbonate polyol bi) can have compositions which are independent of one another. Furthermore, it is possible for not all or only one of the n polymer chains to grow by means of alkoxylation during the addition reaction.

If mixtures of starter substances are used, then different structures of polyether carbonate polyols bi) of the general formula (II) can be present side by side.

If $u_i$, $v_i \neq 0$ in the general formula (II), then the individual building blocks (R2—O) and (R3—O) can, independently of C(=O)—O units, be bound to one another either in the form of blocks, strictly alternating, randomly or in the form of gradients.

Particular preference is given to polyether carbonate polyols bi) made up of starter substances, propylene oxide and $CO_2$. These can be described by the general formula (III):

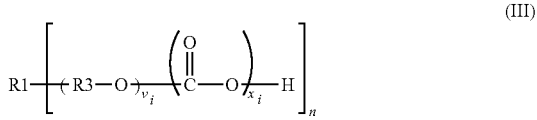
(III)

where R1 and R3 are as defined in formula (I) and
$v_i$ is an integer of 4-400;
$x_i$ is an integer from 1 to 100, where, in addition, neither —C(=O)—O—C(=O)—O— bonds (carbonate-carbonate bond) occur nor a —C(=O)—OH bond occurs at the end of the chain in polyether carbonate polyols bi) of the general formula (III);
n is an integer from 2 to 100, preferably from 2 to 8, particularly preferably from 2 to 4, in particular 2 or 3;
i is an integer from 1 to n.

Furthermore, the following relationships preferably apply to the general formula (III):

$$\frac{1}{n} * \sum_{i=1}^{n} \frac{x_i}{v_i + x_i} = 0.02 \text{ to } 0.25$$

$$\frac{1}{n} * \sum_{i=1}^{n} \frac{v_i}{v_i + x_i} = 0.75 \text{ to } 0.98$$

The monomer building blocks can be present in any order in the individual polymer chains 1 to n, but neither —C(=O)—O—C(=O)—O— bonds (carbonate-carbonate bond) occur within the polymer chains nor —C(=O)—OH bonds occur at the chain end of individual polymer chains. In addition, the n polymer chains of the polyether carbonate polyol bi) can have compositions which are independent of one another. Furthermore, it is possible for not all or only one of the n polymer chains to grow by means of alkoxylation during the addition reaction.

If mixtures of starter substances are used, then different structures of polyether carbonate polyols bi) of the general formula (III) can be present side by side.

The preparation of polyether carbonate polyols bi) by polymerization of carbon dioxide and alkylene oxides in the presence of multimetal cyanide catalysts is known.

A particularly preferred process for preparing the polyether carbonate polyols is described below.

The polyether carbonate polyols bi) of the general formula (I), (II) or (III) are prepared, as described, by catalytic addition of alkylene oxides and carbon dioxide onto H-functional starter substances. To carry out the reaction, the starter substance or a mixture of at least two starter substances is placed in a reaction vessel and, if necessary, water and/or other volatile compounds are removed. This is effected, for example, by stripping with nitrogen under reduced pressure or by distillation under reduced pressure at temperatures of 50-200° C., preferably 80-160° C., particularly preferably 100-130° C. Distillation under reduced pressure at temperatures of 100-130° C. is preferred in the process according to the invention described here. This pretreatment of the starter substance or the mixture of starter substances will hereinafter be referred to as drying in the interests of simplicity.

The catalyst can have been placed in the reaction vessel together with the starter substance or the mixture of at least two starter substances, but it is also possible for the catalyst to be added only after drying of the starter substance or the mixture of starter substances. The catalyst can be added in solid form or as a concentrated suspension in a starter substance. The catalyst is preferably added as a suspension in a starter substance, particularly preferably in the same starter substance or starter substance mixture as previously placed in the reaction vessel. If the catalyst is added as a suspension, this is preferably added before the drying of the starter substance(s). Typical concentrations of the catalyst suspension are 2-50% by weight, preferably 2-25% by weight, and particularly preferably 2-10% by weight.

Before introduction of the alkylene oxides and the carbon dioxide, the reactor can be made inert by means of a protective gas such as nitrogen or is evacuated. The reactor is preferably made inert by repeated, alternate application of vacuum and subsequent flushing with nitrogen before introduction of the alkylene oxides and the carbon dioxide in order to avoid undesirable reactions of the alkylene oxides with oxygen.

A person skilled in the art will know that appropriate characteristic properties of the starter substances and the polyether carbonate polyol bi) are used for calculating the amounts of alkylene oxides and carbon dioxide to be used. If, for example, a polyfunctional alcohol is used, its hydroxyl number and the desired hydroxyl number on the polyether carbonate polyol bi) to be synthesized therewith serve as basis for calculation of the amounts of alkylene oxides and carbon dioxide. If amines are used as starter substances, the amine numbers serve as basis, in the case of acids the corresponding acid numbers. To determine a hydroxyl, amine or acid number, it is necessary to know the functionality of the substance measured. Furthermore, it is well known that the functionality of the starter substance used or the mixture of a plurality of starter substances determines the functionality of the polyol prepared by means of alkoxylation of this. The same applies here to the polyether carbonate polyols bi) according to the invention. A trifunctional starter substance, for example glycerol, accordingly produces a trifunctional polyether carbonate polyol bi). Furthermore, it is known that impurities such as water can influence the functionality.

In the preferred process, it is essential to monitor the amount of unreacted alkylene oxides in the liquid phase during the entire addition time. This amount will hereinafter be referred to as concentration of free alkylene oxide. The free alkylene oxide concentration can be measured, for example, by means of an ATR-FTIR sensor, a density measurement, GC, GC/MS, HPLC or other direct or indirect methods. Advantageous concentration ranges for the free alkylene oxides have been found to be 0-40% by weight, particularly preferably 0-25% by weight, in particular 0-15% by weight and very particularly preferably 0-10% by weight.

The introduction of one or more alkylene oxides and of carbon dioxide is carried out after the optional drying of a starter substance or the mixture of a plurality of starter substances and the addition of the multimetal cyanide catalyst which is added before or after drying as a solid or in the form of a suspension. The introduction of one or more alkylene oxides and of the carbon dioxide can in principle be carried out in various ways. The start of the introduction can be effected from the reduced pressure or at a previously selected initial pressure. The initial pressure is preferably set by introducing an inert gas such as nitrogen, with the pressure being set to 10 mbar-5 bar, preferably 100 mbar-3 bar and more preferably 500 mbar-2 bar.

In principle, the introduction of one or more alkylene oxides and of the carbon dioxide can be carried out simultaneously or sequentially, with the total amount of carbon dioxide being able to be added all at once or metered over the reaction time. Preference is given to metered addition of the carbon dioxide. The introduction of one or more alkylene oxides is effected simultaneously with or subsequent to the introduction of carbon dioxide. If a plurality of alkylene oxides are used for the synthesis of the polyether carbonate polyols bi), they can be introduced simultaneously or sequentially via separate feed streams or via one or more feed streams, with at least two alkylene oxides being fed in as a mixture. Altering the way in which the alkylene oxides and the carbon dioxide are introduced makes it possible to synthesize random, alternating, block or gradated polyether carbonate polyols bi). In the process of the invention, it is important that the concentration of one or more free alkylene oxides is 0-40% by weight, particularly preferably 0-25% by weight, in particular 0-15% by weight and very particularly preferably 0-10% by weight, based on the mass of the liquid phase, during the entire addition time.

The amount of carbon dioxide to be used for the synthesis of the polyether carbonate polyols bi) is calculated from the above-described characteristic properties of the starter substances used, the hydroxyl number of the product and the desired amount of carbon dioxide incorporated in the polyether carbonate polyol bi). The amount of carbon dioxide used can deviate from the calculated amount. Preference is given to using an excess of carbon dioxide; in particular, the amount of carbon dioxide is determined via the total pressure under the reaction conditions. Due to the sluggishness with which carbon dioxide reacts, an excess of carbon dioxide is advantageous. Furthermore, it has been found in the process of the invention that reaction at 60-150° C., preferably 70-140° C., particularly preferably 80-130° C., and pressures of 0-20 bar, preferably 1-15 bar and particularly preferably 3-10 bar, produces desired polyether carbonate polyols bi). If temperatures below 60° C. are set, the reaction stops. At temperature above 150° C., the amount of undesirable by-products increases greatly.

After the starter substance or a mixture of a plurality of starter substances together with the multimetal cyanide catalyst has been dried and made inert, one or more alkylene oxides and carbon dioxide can be introduced either from the reduced pressure or at a set initial pressure, preferably from reduced pressure. The addition of carbon dioxide can be carried out before, after or simultaneously with the addition of alkylene oxide. Here, it is possible to add a calculated amount of carbon dioxide, an excess over the calculated amount of carbon dioxide or such an amount of carbon dioxide that a particular reactor pressure is established. The introduction of the carbon dioxide is preferably carried out after the commencement of the introduction of one or more alkylene oxides. In a particular embodiment of the invention, part of the total amount of one or more alkylene oxides is firstly added to the mixture of one or more starter substances and the catalyst in order to activate the system. Only then is carbon dioxide fed into the reaction mixture. The partial amount can be 0.1-20%, preferably 0.5-10% and particularly preferably 1-5%, based on the total amount of alkylene oxides to be introduced.

If more than one alkylene oxide is used for the synthesis of the polyether carbonate polyols bi), the alkylene oxides can be introduced either separately or as mixtures. It will be self-evident to a person skilled in the art that separate feed streams are necessary to form block structures. Random structures can be achieved by separate feed streams of individual alkylene oxides or by introduction of mixtures of alkylene oxides. Furthermore, combinations of different structural types in one polyether carbonate polyol bi) can be influenced by the manner of introduction as separate feed streams or as introduction of mixtures, and the time sequence of the additions. Furthermore, it is possible to control the incorporation of carbon dioxide in the synthesis of polyether carbonate polyols bi) according to when and at what reactor pressure carbon dioxide is present in the system. For example, it is possible to stop all additions temporarily during a reaction, allow the amounts of alkylene oxides and carbon dioxide present in the reactor to react or remove them by application of vacuum and then continue to introduce either only one alkylene oxide, a plurality of alkylene oxides or mixtures of a plurality of alkylene oxides without feeding in further carbon dioxide. For example, it is possible to use a polypropylene glycol having Mn=600 g/mol as starter substance and react it firstly with propylene oxide and carbon dioxide in the presence of the catalyst. After a particular amount of propylene oxide and carbon dioxide has been introduced, the introduction of carbon dioxide is stopped, the system is evacuated briefly and only propylene oxide is subsequently fed in. This gives a polyether carbonate polyol bi) which comprises a pure polypropylene block in the middle part of the molecule, comprises a chain made up of randomly distributed propylene glycol and carbonate units on each side of the molecule and has further pure propylene glycol units as end blocks.

In a preferred embodiment of the invention, the polyether carbonate polyols bi) have a block of pure alkylene oxide units, in particular pure propylene oxide units, at the end of the chain.

The starter substance or a mixture of a plurality of starter substances together with the catalyst is preferably dried, made inert and the reactor is then evacuated. A partial amount of one or more alkylene oxides is then introduced to activate the system. The partial amount can be 0.1-20%, preferably 0.5-10% and particularly preferably 1-5%, based on the total amount of alkylene oxides to be introduced. The partial amount added to effect activation can consist of either only one alkylene oxide, a plurality of separately introduced alkylene oxides or a mixture of at least two alkylene oxides. The partial amount preferably consists of one alkylene oxide or a mixture of at least two alkylene oxides, particularly preferably one alkylene oxide and in particular propylene oxide. The activation of the system is indicated by an exothermic reaction and/or a decrease in pressure in the reactor.

After the activation of the starter/catalyst system, carbon dioxide is fed in, with it being possible for the entire amount to be used to be added all at once or the carbon dioxide to be added in a regulated fashion at a set flow rate. In a further embodiment, the carbon dioxide is introduced via a regulating valve and at a set pressure. If the reactor pressure drops below a set pressure, carbon dioxide is introduced until the set pressure has been reached again. The total amount of carbon dioxide used is preferably greater than the amount calculated from the desired amount of carbon dioxide incorporated in the polyether carbonate polyol bi). Carbon dioxide is preferably introduced at a set flow rate or by means of a set pressure, particularly preferably by means of a set pressure. It will be self-evident to a person skilled in the art that a particular amount of carbon dioxide will be present in the reactor at a preset pressure and at a set temperature as a function of the reactor volume, the fill height of the reactor, the properties of the liquid phase, the composition of the gas phase and further parameters. This means that the available amounts of carbon dioxide at constant pressure and constant temperature are different during the reaction since the other parameters change during the reaction.

In the preferred process, it has been found that reaction at 60-150° C., preferably at 70-140° C., particularly preferably at 80-130° C., and pressures of 0-20 bar, preferably 1-15 bar and particularly preferably 3-10 bar, produces desired polyether carbonate polyols bi). Here, both the temperature and the pressure can remain constant or vary within the indicated limits during the reaction. It is possible to realize temperature and/or pressure profiles in which the temperature and/or pressure can be reduced or increased stepwise or continuously during the reaction. Likewise, one or more additions of one or more alkylene oxides and carbon dioxide can be varied during the reaction, with feed streams being able to be switched in, shut off or addition rates being increased or reduced. This is important because, in particular, it has surprisingly been found that the polyether carbonate polyols bi) according to the invention having a content of incorporated carbon dioxide in the form of carbonate units, based on the molecular part built up by the reaction without the starter substance, of 2-25% by weight, preferably 3-20% by weight and particularly preferably 5-15% by weight, and having a particularly low content of by-products in the form of cyclic carbonates can be synthesized by taking account of the content of free alkylene oxides during the reaction. This means that it has to be ensured that the indicated upper limits for free alkylene oxides are not exceeded in the synthesis. It has surprisingly been found that free alkylene oxide concentrations which are too high produce higher proportions of undesirable by-products. This can mean that feed streams of alkylene oxides have to be temporarily decreased or shut off entirely or the reactor temperature has to be increased during the addition time in order to avoid further accumulation of alkylene oxides. The formation of cyclic by-products can also be reduced by incorporation of a block of pure alkylene oxides at the end of the chain.

Should formation of cyclic by-products occur in the preparation of the polyether carbonate polyols bi), these have to be removed before processing to produce the polyurethane foam. This can be achieved, for example, by distillation.

Regulation of the introduction of carbon dioxide during the reaction results in better control of the reaction and the reaction not stopping. Here, a greater amount of carbon dioxide produces a higher pressure and a slower reaction, while a smaller amount of carbon dioxide produces a low pressure and a faster reaction.

The multimetal cyanide catalysts used for the preparation of the polyether carbonate polyols bi) preferably have the general formula (IV)

$$M^1_a[M^2(CN)_b(A)_c]_d \cdot fM^1gX_n \cdot h(H_2O) \cdot eL \qquad (IV)$$

where $M^1$ is a metal ion selected from the group consisting of Zn2+, Fe2+, Co3+, Ni2+, Mn2+, Co2+, Sn2+, Pb2+, Mo4+, Mo6+, A3+, V4+, V5+, Sr2+, W4+, W6+, Cr2+, Cr3+, Cd2+, $M^2$ is a metal ion selected from the group consisting of Fe2+, Fe3+, Co2+, Co3+, Mn2+, Mn3+, V4+, V5+, Cr2+, Cr3+, Rh3+, Ru2+, Ir3+ and $M^1$ and $M^2$ are identical or different,

A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters,ureas, amides, nitriles and sulfides, and a, b, c, d, g and n are selected so that the compound is electrically neutral and e is the coordination number of the ligand, f is a fraction or integer greater than or equal to 0, h is a fraction or integer greater than or equal to 0.

These compounds are prepared by generally known methods, by combining the aqueous solution of a water-soluble metal salt with the aqueous solution of a hexacyanometalate compound, in particular a salt or an acid, and adding a water-soluble ligand to the mixture while the solutions are being combined or after they have been combined. To prepare the polyether alcohol according to the invention, preference is given to using multimetal cyanide catalysts in which the hexacyano-metalate compound used is the corresponding acid.

The catalyst is usually used in an amount of less than 1% by weight, preferably in an amount of less than 0.5% by weight, particularly preferably in an amount of less than 500 ppm and in particular in an amount of less than 100 ppm, in each case based on the weight of the polyether carbonate polyol bi).

In a preferred embodiment, the polyether carbonate polyols bi) are admixed with stabilizers against thermooxidative degradation after they have been prepared.

Particular preference is given to using amine-free stabilizers against thermooxidative degradation, preferably stabilizers selected from the group consisting of
i) sterically hindered phenols,
ii) lactones, in particular benzofuran-2-one derivatives
iii) further amine-free antioxidants which do not eliminate phenol, for example sterically hindered phosphites,
and any mixtures of these compounds with one another.

Examples of sterically hindered phenols i) are octadecyl 3-(3,5-di-t-butyl-4-hydroxy-phenyl)propionate) (Irganox® 1076 from CIBA), 3,5-bis(1,1-dimethylethyl-4-hydroxy-C7-C9-alkyl)-branched esters (Irganox® 1135 from CIBA), ethylene(bisoxyethylene) bis(3-(5-t-butylhydroxy-4-tolyl)propionate) (Irganox® 245 from CIBA).

Examples of lactones ii), in particular benzofuran-2-one derivatives, are described in 25 EP 1 291 384 and DE 196 18 786.

Examples of amine-free antioxidants which do not eliminate phenol iii) are, for example, described in the patent EP 905 180, for example tris(2,4-di-t-butylphenyl) phosphite.

As indicated, the polyether carbonate polyols bi) are reacted with polyisocyanates to produce polyurethane foams, in particular flexible polyurethane foams. Here, the polyether carbonate polyols bi) according to the invention can be used individually, as a mixture of at least two polyether carbonate polyols bi) according to the invention or in admixture with other compounds having at least two active hydrogen atoms. The polyether carbonate polyols bi) according to the invention are preferably used in a proportion of from 10 to 100% by weight, in particular from 50 to 100% by weight and very preferably from 80 to 100% by weight, in the component b).

As polyisocyanates a), use is here made of all isocyanates having two or more isocyanate groups in the molecule. It is possible to use either aliphatic isocyanates such as hexamethylene diisocyanate (HDI) or isophorone diisocyanate (IPDI) or preferably aromatic isocyanates such as tolylene diisocyanate (TDI), diphenylmethane diisocyanate (MDI) or mixtures of diphenylmethane diisocyanate and polymethylenepolyphenylene polyisocyanates (crude MDI). It is also possible to use isocyanates which have been modified by incorporation of urethane, uretdione, isocyanurate, allophanate, uretonimine and other groups, known as modified isocyanates.

Particular preference is given to using tolylene diisocyanate (TDI), diphenylmethane diisocyanate (MDI) or mixtures of diphenylmethane diisocyanate and polymethylenepolyphenylene polyisocyanates in the process of the invention.

As compounds having at least two active hydrogen atoms b) which can be used together with the polyether carbonate polyols bi) used according to the invention, it is possible to employ, in particular, polyester polyols and preferably polyether polyols having a functionality of from 2 to 8, in particular from 2 to 4, preferably from 2 to 3, and a molecular weight $M_n$ in the range from 400 to 8500 g/mol, preferably from 1000 to 6000 g/mol. The polyether polyols can be prepared by known methods, usually by catalytic addition of alkylene oxides, in particular ethylene oxide and/or propylene oxide, onto H-functional starter substances or by condensation of tetrahydrofuran. H-functional starter substances used are, in particular, polyfunctional alcohols and/or amines. Preferred alcohols are dihydric alcohols, for example, ethylene glycol, propylene glycol or butanediols, trihydric alcohols, for example glycerol, trimethylolpropane or castor oil or pentaerythritol, and also higher-functionality alcohols such as sugar alcohols, for example sucrose, glucose or sorbitol. Preferred amines are aliphatic amines having up to 10 carbon atoms, for example ethylenediamine, diethylenetriamine, propylenediamine, aromatic amines, for example toluenediamine or diaminodiphenylmethane, and also amino alcohols such as ethanolamine or diethanolamine.

The polyether polyols are usually prepared by catalytic addition of alkylene oxides, in particular ethylene oxide and/or propylene oxide, onto H-functional starter substances. As catalysts, preference is given to using basic compounds in particular hydroxides of alkali metals. In recent times, use has frequently also been made of multimetal cyanide compounds, also referred as DMC catalysts.

As polyether polyols, it is also possible to use polymer-modified polyether polyols. These are usually prepared by in-situ polymerization of olefinically unsaturated monomers, in particular acrylonitrile and/or styrene, in the polyether polyols. Poly-modified polyether polyols also include polyether polyols comprising polyurea dispersions.

The polymer-modified polyether polyols preferably have a hydroxyl number in the range from 10 to 100 mg KOH/g, more preferably from 15 to 60 mg KOH/g, and preferably a solids content of 2-60% by weight, more preferably 5-50% by weight.

For particular fields of use, it can be advantageous to use chain extenders and/or crosslinkers in addition to the polyhydroxyl compounds mentioned in the production of the flexible polyurethane foams. Possible agents of this type are polyfunctional, in particular bifunctional and trifunctional, compounds having molecular weight $M_n$ of from 62 to 600 g/mol, preferably from 62 to 300 g/mol. Examples of compounds used are dialkanolamines and trialkanolamines such as diethanolamine and triethanolamine, aliphatic and aromatic diamines such as ethylenediamine, butylenediamine, 1,4-butylenediamine, 1,6-hexamethylenediamine, 4,4'-diaminodiphenylmethane, 3,3'-dialkyl-substituted 4,4'-diaminodiphenylmethanes, 2,4- and 2,6-toluenediamine and preferably aliphatic diols and triols having from 2 to 6 carbon atoms, e.g. ethylene glycol, propylene glycol, 1,4-butylene glycol, 1,6-hexamethylene glycol, glycerol and trimethylolpropane.

If chain extenders or crosslinkers are used, they are employed in amounts of from 1 to 20 parts by weight, preferably from 3 to 10 parts by weight, per 100 parts by weight of polyhydroxyl components.

The reaction usually takes place in the presence of blowing agents, catalysts and auxiliaries and/or additives.

As blowing agent for the process of the invention, it is usual to use water which reacts with isocyanate groups to form carbon dioxide. The amount of water which are advantageously used are, depending on the desired density of the foams, from 0.1 to 8 parts by weight, preferably from 1.5 to 5 parts by weight, based on 100 parts by weight of component b).

It is also possible, if appropriate, to use physically acting blowing agents in admixture with water. These are liquids which are inert toward the formulation constituents and have boiling points below 100° C., preferably below 50° C., in particular in the range from −50° C. to 30° C., at atmospheric pressure, so that they vaporize under the influence of the exothermic polyaddition reaction. Examples of such preferred liquids are hydrocarbons such as pentane, n-butane and isobutane and propane, ethers such as dimethly ether and diethyl ether, ketones such as acetone and methyl ethyl ketone, ethyl acetate and preferably halogenated hydrocarbons such as methylene chloride, trichlorofluoromethane, dichlorodifluoromethane, dichloromonofluoromethane, dichlorotetrafluoroethane and 1,1,2-trichloro-1,2,2-trifluoroethane. Mixtures of these low-boiling liquids with one another and/or with other substituted or unsubstituted hydrocarbons can also be used.

It is also possible to use carbon dioxide as blowing agent, and this is preferably dissolved as gas in the starting components.

Preference is given to using water and/or carbon dioxide as blowing agent.

The amount of physically acting blow agents required in addition to water can be determined in a simple manner as a function of the desired foam density and is from about 0 to 50 parts by weight, preferably from 0 to 20 parts by weight, per 100 parts by weight of polyhydroxyl compound.

Auxiliaries and/or additives can also be incorporated into the reaction mixture. Mention may be made of, for example, external and internal mold release agents, foam stabilizers, hydrolysis inhibitors, pore regulators, fungistatic and bacteriostatic substances, dyes, pigments, fillers, surface-active substances and flame retardants and compounds for improving the bond strength in flame lamination.

As compounds which improve the bond strength in flame lamination, mention may be made of, for example, phosphorus-containing flame retardants and polyols having aromatic structural units. Preference is given to using incorporatable or high molecular weight flame retardants such as Fyrol PNX from AKZO and Exolit OP 560 from Clariant, and also bisphenol A alkoxylates. When the polyether carbonate polyols bi) are used, the use of additives for improving adhesion in flame lamination can be dispensed with.

As catalysts for producing flexible slabstock foams, preference is given to using incorporatable or high molecular weight catalysts such as organic metal compounds, in particular tin(II) and zinc salts of ricinoleic acid, dimethylaminoethanol, N,N-dimethyl-N',N'-di(2-hydroxypropyl)-1,3-diaminopropane, N,N-dimethylamino-propylamine, N,N-dimethyl-N-hydroxyethylaminoethyl N'-methylaminoethyl ether, 6-dimethylaminoethyl-1-hexanol, N-(2-hydroxypropyl)imidazole, N-(3-amino-propyl)imidazole, aminopropyl-2-methylimidazole, N,N,N'-trimethylaminoethanolamine, 2-(2-(N,N-dimethylamino)ethoxy)ethanol, N-(dimethyl-3-aminopropyl)urea derivatives and alkylaminooxamides such as bis-(N-(N',N'-dimethylaminopropyl))oxamide, bis(N-(N',N'-dimethylaminoethyl))oxamide, bis(N-(N',N'-imidazolidinylpropyl)oxamide, bis(N-(N',N'-diethylaminoethyl))oxamide, bis(N-(N',N'-diethylaminopropyl)oxamide, bis(N-(N',N'-diethylaminoethyl)oxamide, bis(N-(N',N'-diethylimino-1-methyl-propyl)oxamide, bis(N-(3-morpholinopropylyl)oxamide and their reaction products with alkylene oxides, preferably products having a molecular weight in the range from 160 to 500 g/mol, and also compounds of the general formula:

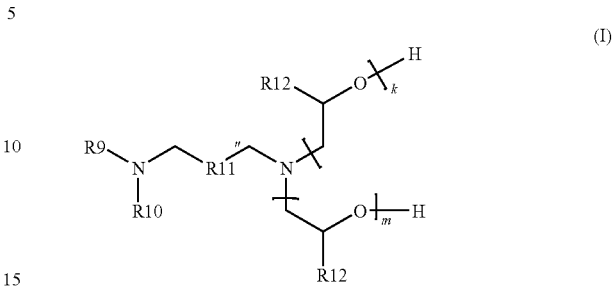

where
R9, R10=—$C_aH_{2a+1}$ where a=1-4 for acyclic groups
R9-R10=—$C_bH_cN_d$—where b=3-7, c=6-14, d=0-2 for cyclic groups
R11=$C_eH_fO_g$ where e=0-4, f=0-8, g=0-2
R12=—H, —$CH_3$, —$C_2H_5$
k, m=identical to or different from 1-5

These can be used individually or in any mixtures with one another.

Such catalysts and/or mixtures are commercially available, for example under the names Lupragen® DMEA, Lupragen® API, Toyocat® RX 20 and Toyocat® RX 21, DABCO® NE 400, DABCO® NE 500, DABCO® NE 600, DABCO® NE 1060 and DABCO® NE 2039, Niax® EF 860, Niax® EF 890, Niax® EF 700, Niax® EF 705, Niax® EF 708, Niax® EF 600, Niax® EF 602, Kosmos® 54, Kosmos® EF, and Tegoamin® ZE 1.

In the industrial production of polyurethane foams, it is customary to combine the compounds having at least two active hydrogen atoms and the further starting materials and also auxiliaries and/or additives to form a polyol component prior to the reaction.

Further information about the starting materials used may be found, for example, in Kunststoffhandbuch, Volume 7, Polyurethane, edited by Gunter Oertel, Carl-Hanser-Verlag, Munich, 3rd edition 1993.

To produce the polyurethanes of the invention, the organic polyisocyanates are reacted with the compounds having at least two active hydrogen atoms in the presence of the above-mentioned blowing agents, catalysts and auxiliaries and/or additives, which are preferably combined with the compounds having at least two active hydrogen atoms to form a polyol component.

In the production of the polyurethanes of the invention, isocyanate and polyol component are combined in such amounts that the index is preferably in the range from 50 to 200, more preferably from 70 to 150 and in particular from 80 to 120.

The polyurethane foams are preferably produced by the one-shot process, for example with the aid of the high-pressure or low-pressure technique. The foams can be produced in open or closed metallic molds or by continuous application of the reaction mixture to conveyor belts so as to produce slabstock foams.

It is particularly advantageous to employ the two-component process in which, as mentioned above, a polyol component and an isocyanate component are produced and foamed. The components are preferably mixed at a temperature in the range from 15 to 120° C., preferably from 20 to 80° C., and introduced into the mold or applied to the conveyor belt. The temperature in the mold is usually in the range from 15 to 120° C., preferably from 30 to 80° C.

The flexible polyurethane foams produced by the process of the invention have, as described, very low emissions (VOC and FOG) combined with the mechanical properties and aging properties required by the market. The value for VOC emissions, determined in accordance with VDA 278, is not more than 100 ppm, and the value for FOG emissions, determined in accordance with VDA 278, is not more than 250 ppm.

At slabstock or mold interior temperatures of up to 165° C. during the foaming process, they display no core discoloration and a better light stability.

They are used, for example, in motor vehicle interiors, furniture, mattresses, cushions, sponges, clothing and shoes, preferably in motor vehicle interiors and for producing furniture and mattresses.

In flame lamination, the flexible polyurethane foams of the invention display a bond strength of at least 6 N/50 mm without concomitant use of compounds which improve the bond strength in flame lamination.

The invention is illustrated by the following examples.

Analysis:

ATR-FTIR (attenuated total reflection) for IR on-line measurement

During the reaction, the contents of free propylene oxide (828 cm$^{-1}$), the carbonate content of the polyether carbonate polyol (1745 cm$^{-1}$) and the carbonate content of the propylene carbonate (1814 cm$^{-1}$) are detected. The area integrals of the absorptions at the wave numbers indicated serve to determine the contents by mass of the corresponding species. The ATR-FTIR sensor was calibrated beforehand.

Precise determination of the carbonate contents of the polyether carbonate polyols bi) was carried out using quantitative $^{13}$C-NMR. The carbonate signals in the range 150-160 ppm serve as basis for the evaluation. The evaluation gives the sum of the carbonate contents of polyether carbonate polyol and propylene carbonate of the isolated product.

By means of an additional GC measurement, the propylene carbonate content can be determined and the $CO_2$ content of the polyether carbonate polyol bi) can thus be determined indirectly.

EXAMPLE 1

Preparation of a polyether carbonate polyol (110° C., 7.5 bar) without propylene oxide end block and having a functionality of 2.75

In a 20 l pressure reactor, 5755 g of starter polyol (polyether polyol based on glycerol/diethylene glycol 3/1, OHN=139 mg KOH/g) and 262 g of a 6.6% strength suspension of a DMC catalyst in starter polyol were dried at 130° C. under reduced pressure (20 mbar) for 2 hours. The mixture was then cooled to 110° C. 200 g of propylene oxide were then metered in from the reduced pressure at an addition rate of 1 kg/h and the addition was then stopped. After the activation of the catalyst, carbon dioxide was introduced until the reactor pressure had risen to 7.5 bar after 10 minutes. After 40 minutes, further propylene oxide was metered in. The rate of addition of the propylene oxide was increased gradually from 0.5 kg/h to 4.0 kg/h, ensuring, by means of ATR-FTIR, that the concentration of free propylene oxide did not exceed 5%. The introduction of carbon dioxide was effected during the entire reaction by means of a regulating valve which kept the total pressure at 7.5 bar. The amount of 10 520 g of propylene oxide was thus metered in over a period of 4.5 h, with 1950 g of carbon dioxide being consumed. After the reaction was complete, the reactor was depressurized and a sample of crude product was taken. The product was then stripped by means of nitrogen at 150° C./50 mbar for 3 hours.

Weight of product: 17.1 kg

Product data:

OHN=50.1 mg KOH/g

Viscosity (25° C.)=1869 mPas

Carbonate content of the polyether carbonate polyol:

a) Based on the total molecule: 6.8% by weight b) Based on the polymerized part without starter polyol: 10.6% by weight GPC: $M_n$=3066 g/mol; $P_D$=1.98

The propylene content of the crude product could be determined from analysis of the crude product.

Propylene carbonate content: 4.9% by weight

EXAMPLE 2

Preparation of a polyether carbonate polyol (110° C., 7.5 bar) having a propylene oxide end block and a functionality of 2.75

In a 20 l pressure reactor, 5877 g of starter polyol (polyether polyol based on glycerol/diethylene glycol 3/1, OHN=139 mg KOH/g) and 131 g of a 6.6% strength suspension of a DMC catalyst in starter polyol were dried at 130° C. under reduced pressure (20 mbar) for 2 hours. The mixture was then cooled to 110° C. 150 g of propylene oxide were then metered in from the reduced pressure at an addition rate of 1 kg/h. After the activation of the catalyst, carbon dioxide was introduced in parallel until the reactor pressure had risen to 7.5 bar after 10 minutes. The rate of addition of the propylene oxide was increased gradually from 1.0 kg/h to 4.0 kg/h, ensuring, by means of ATR-FTIR, that the concentration of free propylene oxide did not exceed 5%. The introduction of carbon dioxide was effected by means of a regulating valve which kept the total pressure at 7.5 bar. After 6500 g of propylene oxide had been metered in, the introduction of carbon dioxide was stopped without interrupting the introduction of propylene oxide. The total amount of 10 520 g of propylene oxide was introduced over a period of 4 hours. The total amount of carbon dioxide was 1253 g. After the reaction was complete, the reactor was depressurized. The product was stripped by means of nitrogen at 150° C./50 mbar for 3 hours.

Weight of product: 16.7 kg

Product data:

OHN=49.6 mg KOH/g

Viscosity (25° C.)=1280 mPas

Carbonate content of the polyether carbonate polyol:

a) Based on the total molecule: 5.3% by weight b) Based on the polymerized part without starter polyol: 8.4% by weight GPC: $M_n$=2989 g/mol; $P_D$=1.58

The propylene content of the crude product could be determined from analysis of the crude product.

Propylene carbonate content: 3.3% by weight

EXAMPLE 3

Preparation of a polyether carbonate polyol (110° C., 4.0 bar) having a propylene oxide end block and a functionality of 2.75

In a 20 l pressure reactor, 5939 g of starter polyol (polyether polyol based on glycerol/diethylene glycol 3/1, OHN=141 mg KOH/g) and 62 g of a 5.7% strength suspension of a DMC catalyst in starter polyol were dried at 130° C. under reduced pressure (20 mbar) for 2 hours. The mixture was then cooled to 110° C. 450 g of propylene oxide were then metered in from the reduced pressure at an addition rate of 1.5 kg/h and the addition was then stopped. After the activation of the catalyst, carbon dioxide was introduced until the reactor pressure had risen to 4.0 bar (5 min). After 20 minutes, further propylene oxide was fed in. The rate of addition of the propylene oxide was increased gradually from 1.0 kg/h to 3.5 kg/h, ensuring, by means of ATR-FTIR, that the concentration of free propylene oxide did not exceed 5%. The introduction of carbon dioxide was effected during the entire reaction by means of a regulating valve which kept the total pressure at 4.0 bar. After 8800 g of propylene oxide had been metered in, the introduction of carbon dioxide was stopped without interrupting the introduction of propylene oxide. The total amount of 10 463 g of propylene oxide was introduced over a period of 5.5 hours. The total amount of carbon dioxide was 670 g. After the reaction was complete, the reactor was depressurized. The product was stripped by means of nitrogen at 160° C./50 mbar for 3 hours.

Weight of product: 16.4 kg
Product data:
OHN=47.0 mg KOH/g
Viscosity (25° C.)=936 mPas
Carbonate content of the polyether carbonate polyol:
a) Based on the total molecule: 3.5% by weight
b) Based on the polymerized part without starter polyol: 4.9% by weight
GPC:$M_n$=3851 g/mol; $P_D$=1.72
The propylene content of the crude product could be determined from analysis of the crude product.
Propylene carbonate content: 2.2% by weight

EXAMPLE 4

Preparation of a polyether carbonate polyol (110° C., 3.0-8.0 bar) having a propylene oxide end block and a functionality of 2.75

In a 20 l pressure reactor, 5939 g of starter polyol (polyether polyol based on glycerol/diethylene glycol 3/1, OHN=141 mg KOH/g) and 61 g of a 5.7% strength suspension of a DMC catalyst in starter polyol were dried at 130° C. under reduced pressure (20 mbar) for 2 hours. The mixture was then cooled to 110° C. 450 g of propylene oxide were then metered in from the reduced pressure at an addition rate of 1.5 kg/h and the addition was then stopped. After the activation of the catalyst, carbon dioxide was introduced until the reactor pressure had risen to 3.0 bar (3 min). After 15 minutes, further propylene oxide was fed in. The rate of addition of the propylene oxide was increased gradually from 1.0 kg/h to 4.0 kg/h, ensuring, by means of ATR-FTIR, that the concentration of free propylene oxide did not exceed 5%. At the same time, the total pressure was increased from 3.0 bar to 8.0 bar over a period of 2.5 hours by introduction of carbon dioxide by means of a carbon dioxide regulating valve. After 8600 g of propylene oxide had been metered in, the introduction of carbon dioxide was stopped without interrupting the introduction of propylene oxide. The total amount of 10 463 g of propylene oxide was introduced over a period of 5.5 hours. The total amount of carbon dioxide was 1391 g. After the reaction was complete, the reactor was depressurized. The product was stripped by means of nitrogen at 120° C./50 mbar for 2 hours.

Weight of product: 17.1 kg
Product data:
OHN=45.2 mg KOH/g
Viscosity (25° C.)=1534 mPas
Carbonate content of the polyether carbonate polyol:
a) Based on the total molecule: 6.3% by weight
b) Based on the polymerized part without starter polyol: 9.1% by weight
GPC:$M_n$=3543 g/mol; $P_D$=1.63
The propylene content of the crude product could be determined from analysis of the crude product.
Propylene carbonate content: 2.3% by weight

EXAMPLE 5

Preparation of a polyether carbonate (110° C., 3.0-8.0 bar) having a propylene oxide end block and a functionality of 2.0

In a 20 l pressure reactor, 3732 g of starter polyol (homopolypropylene oxide, OHN=250 mg KOH/g) and 68 g of a 5.1% strength suspension of a DMC catalyst in starter polyol were dried at 130° C. under reduced pressure (20 mbar) for 2 hours. The mixture was then cooled to 110° C. 500 g of propylene oxide were then metered in from the reduced pressure at an addition rate of 1.5 kg/h and the addition was then stopped. After the activation of the catalyst, carbon dioxide was introduced until the reactor pressure had risen to 3.0 bar (3 min). After 15 minutes, further propylene oxide was fed in. The rate of addition of the propylene oxide was increased gradually from 1.0 kg/h to 4.0 kg/h, ensuring, by means of ATR-FTIR, that the concentration of free propylene oxide did not exceed 5%. At the same time, the total pressure was increased from 3.0 bar to 8.0 bar over a period of 3 hours by introduction of carbon dioxide by means of a carbon dioxide regulating valve. After 10 500 g of propylene oxide had been metered in, the introduction of carbon dioxide was stopped without interrupting the introduction of propylene oxide. The total amount of 11 876 g of propylene oxide was introduced over a period of 4.5 hours. The total amount of carbon dioxide was 1497 g. After the reaction was complete, the reactor was depressurized. The product was stripped by means of nitrogen at 160° C./50 mbar for 2 hours.

Weight of product: 16.1 kg
Product data:
OHN=53.9 mg KOH/g
Viscosity (25° C.)=793 mPas
Carbonate content of the polyether carbonate polyol:
a) Based on the total molecule: 6.9% by weight
b) Based on the polymerized part without starter polyol: 8.8% by weight
GPC:$M_n$=2107 g/mol; $P_D$=1.60
The propylene content of the crude product could be determined from analysis of the crude product.
Propylene carbonate content: 2.6% by weight
Production of flexible polyurethane foams

COMPARATIVE EXAMPLE 1 AND EXAMPLES 6 TO 8

The starting materials listed in Table 1 were reacted in the ratios indicated in Table 1.

All components apart from the isocyanate Lupranat® T 80 A were firstly combined by intensive mixing to form a polyol component. The Lupranat® T 80 A was then added with stirring and the reaction mixture was poured into an open mold in which it foamed to produce the polyurethane foam. The properties of the foams obtained are shown in Table 1.

The following properties were determined in accordance with the standards, operating procedures and test methods indicated:

| | |
|---|---|
| Foam density in kg/m³ | DIN EN ISO 845 |
| Air permeability in dm³/min | DIN EN ISO 7231 |
| Compressive strength, 40% deformation in kPa | DIN EN ISO 2439 |
| Indentation resistance, 40% deformation | DIN EN ISO 2439 |
| Elongation in % | DIN EN ISO 1798 |
| Tensile strength in kPa | DIN EN ISO 1798 |
| Rebound resilience in % | DIN EN ISO 8307 |
| Compression set in % | DIN EN ISO 3386 |
| Hot/humid storage | DIN EN ISO 2240 |
| Wet compression set | operating procedure AA U10-131-041 of Feb. 6, 2002 |
| FOG in ppm | VDA 278 |
| VOC in ppm | VDA 278 |

The determination of the wet compression set was carried out in accordance with the operating procedure AA U10-131-041 of Feb. 6, 2002:

The height of a previously marked position on the foam test specimens having dimensions of 50 mm×50 mm×25 mm is determined by means of a caliper gauge or transducer. The test specimens are subsequently placed between two pressure plates and compressed by means of a clamping device to a height of 7.5 mm with the aid of spacers having this height.

Storage at 50° C. and 95% relative atmospheric humidity in an atmosphere-control cabinet commences immediately after clamping in. After 22 hours, the foam test specimens are quickly removed from the clamping device and stored on a surface having a low thermal conductivity (tray) in the standard atmosphere for 30 minutes to allow them to relax. The remaining height of the marked position is subsequently determined using the same measuring instrument.

The wet compression set is based on the deformation and is calculated as follows:

Wet compression set=$(h_0-h_R)*100/(h_0-7.5 \text{ mm})$ in %

$h_0$ original height in mm $h_R$ remaining height of the test specimen in mm

The bond strength was determined in accordance with the operating procedure AA U10-131-039 of Jan. 31, 2002.

To determine the bond strength, foam specimens (1.5 m×100 mm×5 mm) from Comparative Example 1 and Examples 6-8 were flame laminated with a woven polyester textile sheet on a laboratory lamination unit, melted on one side with regulatable lamination speed, propane gas bar burner and mixing and metering unit for air/fuel gas mixture, from Maria Heller, Labortechnik, 67112 Mutterstadt, under analogous conditions. The lamination speed was in each case 15 m/min. The measurement of the bond strength after 24 hours was carried out in accordance with the operating procedure AA U-10-131-039.

The method serves to determine the bond strength on test specimens of coated polyurethane foams, e.g. foams coated with a film or fabric. The bond strength serves to assess the peeling behavior of the composite layers. One test specimen having the dimensions 50 mm wide×300 mm long×max. 15 mm thick is produced per direction of the material. The support material is subsequently detached from the narrow side to a length of about 40 mm.

Storage and testing are carried out in accordance with standard atmosphere DIN 50014-23/50-2.

Procedure

Equip the universal test machine for determination of the bond strength, i.e. install the clamping device. Call the appropriate Zwick test method, position transverse, check test speed of 125 mm/min. Clamp the foam of the test specimen into the movable transverse and the detached material into the fixed transverse. The upper material is peeled off over a distance of at least 100 mm.

Calculation

The individual results of the peak values of the force, disregarding the 1 st quarter of the test distance, are recorded per direction of the material with the aid of the EDP facility as test results in N/50 mm to one decimal place in the test report. Furthermore, the position of the point of rapture is reported as follows:

rapture before the 100 mm distance, i.e. the foam tore off,=yes no rapture before the 100 mm distance, i.e. the foam peeled uniformly off the support material

| | Comparative Example 1 | Example 6 | Example 7 | Example 8 |
|---|---|---|---|---|
| A component | | | | |
| Lupranol ® 2084 | 100.00 | | | |
| Polyether carbonate polyol from Example 1 | | 100.00 | | |
| Polyether carbonate polyol from Example 3 | | | 100.00 | |
| Polyether carbonate polyol from Example 4 | | | | 100.00 |
| Lupragen ® N 201 | 0.075 | 0.075 | | |
| Lupragen ® N 206 | 0.025 | 0.025 | | |
| DABCO ® NE 500 | | | 0.32 | 0.32 |
| Tegostab ® B 4900 | 1.00 | 1.00 | 1.00 | 1.00 |
| Kosmos 29 | 0.20 | 0.22 | | |
| Kosmos ® EF/Kosmos ® 54 - 3:1 | | | 0.60 | 0.60 |
| Water | 3.80 | 3.80 | 2.30 | 2.30 |
| B component | | | | |
| Lupranat T 80 A - Index | 113 | 113 | 110 | 110 |
| Foaming | | | | |
| Cream time in s | 14 | 21 | 20 | 21 |
| Gel time in s | 96 | 126 | 125 | 122 |
| Rise time in s | 113 | 136 | 132 | 133 |
| Description | blows off slightly | barely blows off | blows off slightly | blows off slightly |

-continued

| | Comparative Example 1 | Example 6 | Example 7 | Example 8 |
|---|---|---|---|---|
| Mechanics | | | | |
| Indentation resistance B 40% in N | 203 | 189 | 156 | 166 |
| Foam density in kg/m$^3$ | 28.5 | 29.5 | 38 | 38.2 |
| Compressive strength 40% in kPa | 5.6 | 6.0 | 4.1 | 4.3 |
| Compression set in % | 2.7 | 2.2 | 4.3 | 4.2 |
| Compression set after hot/humid storage in % | 6.2 | 7.7 | 7.1 | 9.2 |
| Wet compression set in % | 7.1 | 8.3 | 8.3 | 11.3 |
| Tensile strength in kPa | 78 | 79 | 68 | 69 |
| Elongation at break in % | 81 | 77 | 102 | 104 |
| Rebound resilience in % | 43 | 36 | 30 | 28 |
| Air permeability in dm$^3$/min | 91 | 108 | 90 | 70 |
| Flame lamination | | | | |
| Bond strength in N/50 mm | no adhesion | 9.0 | 5.2 | 8.1 |
| Cohesive rapture | no | yes | no | yes |
| Emission | | | | |
| FOG in ppm | 109 | 118 | 112 | 124 |
| VOC in ppm | 448 | 76 | 68 | 87 |

Notes for the table
Lupranol ® 2084 Lupranol 2084 is a polyether polyol from BASF AG which is based on glycerol/diethylene glycol (3/1), has predominantly secondary hydroxyl end groups, is prepared by means of DMC catalysis and has a hydroxyl number of 48 mg KOH/g and a viscosity at 25° C. of 600 mPa · s.
Lupragen ® N201: 1,4-Diazabicyclo[2.2.2]octane (33%) in dipropylene glycol (67%), (BASF AG)
Lupragen ® N206: Bis(2-dimethylaminoethyl)ether (70%) in dipropylene glycol (30%), (BASF AG)
DABCO ® NE 500 Incorporatable amine catalyst (Air Products)
Kosmos ® 29: Tin(II) salt of ethylhexanoic acid (Degussa AG)
Kosmos ® EF and 54 Incorporatable tin and zinc catalysts (Degussa AG)
Tegostab ® B 4900: Silicone stabilizer (Degussa AG)
Lupranat ® T 80 A: Tolylene 2,4-/2,6-diisocyanate mixture in a ratio of 80:20 (BASF AG)

The invention claimed is:

1. A process comprising, reacting:
a) at least one polyisocyanate with
b) at least one compound having at least two hydrogen atoms which are reactive toward isocyanate groups in the presence of
c) at least one blowing agent,
wherein the component b) comprises at least one polyether carbonate polyol bi) which is prepared by a process comprising
introducing at least one alkylene oxide via a stream and carbon dioxide via a stream into a reaction chamber comprising a starter compound and a DMC catalyst,
reacting the at least one alkylene oxide and carbon dioxide with the starter compound in the presence of the DMC catalyst during said introducing, and
terminating the carbon dioxide stream before terminating the at least one alkylene oxide stream,
thereby obtaining the at least one polyether carbonate polyol bi) having
a functionality of at least 2,
a hydroxyl number of from 10 to 500 mg KOH/g,
a content of carbon dioxide incorporated therein of at least 2% by weight, and
a block of pure alkylene oxide units at the end of the polyether carbonate polyol chain.

2. The process according to claim 1, wherein the polyether carbonate polyol bi) has a functionality of from 2 to 8.

3. The process according to claim 1, wherein said starter compound comprises at least one member selected from the group consisting of diethylene glycol, dipropylene glycol, trimethylolpropane, pentaerythritol, castor oil, a hydroxyl-functionalized fat, a hydroxyl-functionalized oil, and glycerol.

4. The process according to claim 1, wherein the polyether carbonate polyol bi) comprises 2-25% by weight of carbon dioxide monomer units, 0-40% by weight of ethylene oxide monomer units and 35-98% by weight of propylene oxide monomer units, in each case based on the weight of the polyether carbonate.

5. The process according to claim 1, wherein the polyether carbonate bi) has a structure represented by general formula (I),

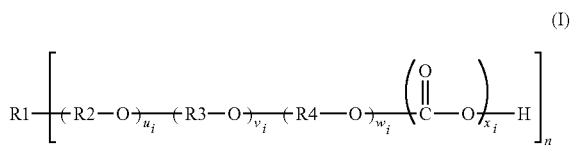

where
monomer units —R2—O—, R3—O—, —R4—O— and —C(O)—O— are present in polyether carbonate in any order where —C(=O)—O—C(=O)—O— groups are not present in the polymer chains and —C(=O)—OH bonds are not present at the chain end of individual polymer chains;
R1 is a starter substance radical without the H atoms which are active in respect of alkylation selected from the group consisting of a molecular radical of a polyhydric alcohol, a polyfunctional amine, a polyhydricthiol, a polyfunctional amino alcohol, a polyhydric thioalcohol, a polyetherol, a polyesterol, a polyesteretherol, a polycarbonate, a polyethylenimine, a hyperbranched polyglycerol, a hyperbranched polycarbonate polyol, a hyperbranched polyesterol, a hyperbranched polyurethane polyol, a polytetrahydrofuran, a polyetheramine, a polytetrahydrofuran amine, a polyetherthiol, a polyacrylatol; a castor oil, a monoglyceride of castor oil, a diglyceride of castor oil, a monoglyceride of a fatty acid, a monoglyceride, diglyceride, a triglyceride, and a $C_1$ $C_{24}$-alkyl fatty acid ester having at least 2 O atoms of hydroxyl groups, whose hydroxyl groups have been introduced beforehand by chemical modification;

R2 is $CH_2-CH_2$,
R3 is $CH_2-CH(CH_3)$,
R4 is $CH_2-CH(R5)$, $CH(R6)-CH(R6)$, $CH_2-C(R6)_2$, $C(R6)_2-C(R6)_2$,

$CH_2-CH-CH_2-R8$, $C_6H_6-CH-CH_2$, $C_6H_6-C(CH_3)-CH_2$, or the molecular radical of monoepoxidized or multiply epoxidized fats or oils as monoglycerides, diglycerides and triglycerides, or the molecular radical of monoexpoxidized or multiply epoxidized fatty acids or their $C_1$-$C_{24}$-alkyl esters, R5 is a $C_2$-$C_{24}$-alkyl radical or alkene radical which may be linear or branched,
R6 is a $C_1$-$C_{24}$-alkyl radical or alkene radical which may be linear or branched,
R7 is a $C_3$-$C_6$-alkyl radical which is arranged linearly,
R8 is OH, Cl, $OCH_3$, $OCH_2-CH_3$, $O-CH_2-CH=CH_2$, or $O-CH=CH_2$, and
$u_i$, $v_i$, $w_i$ are integers of 0-400; with at least one of the indices $u_i$, $v_i$ or $w_i$ being $\geq 1$;
xi is an integer from 1 to 100;
n is an integer from 2 to 100; and
i is an integer from 1 to n.

6. The process according to claim 1, wherein the polyether carbonate bi) has a structure represented by general formula (II),

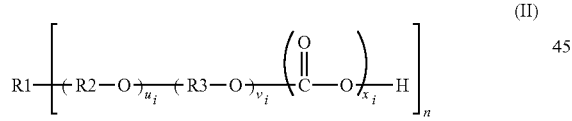

where
monomer units $-R2-O-$, $-R3-O-$, and $-C(O)-O-$ are present in polyether carbonate in any order where $-C(=O)-O-C(=O)-O-$ groups are not present in the polymer chains and $-C(=O)-OH$ groups are not present at the chain end of individual polymer chains;
R1 is a starter substance radical without the H atoms which are active in respect of alkylation selected from the group consisting of a molecular radical of a polyhydric alcohol, a polyfunctional amine, a polyhydricthiol, a polyfunctional amino alcohol, a polyhydric thioalcohol, a polyetherol, a polyesterol, a polyesteretherol, a polycarbonate, a polyethylenimine, a hyperbranched polyglycerol, a hyperbranched polycarbonate polyol, a hyperbranched polyesterol, a hyperbranched polyurethane polyol, a polytetrahydrofuran, a polyetheramine, a polytetrahydrofuran amine, a polyetherthiol, a polyacrylatol; a castor oil, a monoglyceride of castor oil, a diglyceride of castor oil, a monoglyceride of a fatty acid, a monoglyceride, diglyceride, a triglyceride, and a $C_1$ $C_{24}$-alkyl fatty acid ester having at least 2 O atoms of hydroxyl groups, whose hydroxyl groups have been introduced beforehand by chemical modification;

R2 is $CH_2-CH_2$,
R3 is $CH_2-CH(CH_3)$,
and
$u_i$, $v_i$ are integers of 0-400; with at least $u_i$ or $v_i$ being $\geq 1$;
xi is an integer from 1 to 100;
n is an integer from 2 to 100; and
i is an integer from 1 to n.

7. The process according to claim 1, wherein the polyether carbonate bi) has a structure represented by general formula (III),

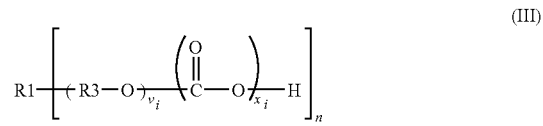

where
monomer units $-R3-O-$ and $-C(O)-O-$ are present in polyether carbonate in any order where $-C(=O)-O-C(=O)-O-$ bonds are not present in the polymer chains and $-C(=O)-OH$ bonds are not present at the chain end of individual polymer chains;
R1 is a starter substance radical without the H atoms which are active in respect of alkylation selected from the group consisting of a molecular radical of a polyhydric alcohol, a polyfunctional amine, a polyhydricthiol, a polyfunctional amino alcohol, a polyhydric thioalcohol, a polyetherol, a polyesterol, a polyesteretherol, a polycarbonate, a polyethylenimine, a hyperbranched polyglycerol, a hyperbranched polycarbonate polyol, a hyperbranched polyesterol, a hyperbranched polyurethane polyol, a polytetrahydrofuran, a polyetheramine, a polytetrahydrofuran amine, a polyetherthiol, a polyacrylatol; a castor oil, a monoglyceride of castor oil, a diglyceride of castor oil, a monoglyceride of a fatty acid, a monoglyceride, diglyceride, a triglyceride, and a $C_1$ $C_{24}$-alkyl fatty acid ester having at least 2 O atoms of hydroxyl groups, whose hydroxyl groups have been introduced beforehand by chemical modification;

R2 is $CH_2-CH_2$,
R3 is $CH_2-CH(CH_3)$, and
$v_i$ is an integer of 4-400;
xi is an integer from 1 to 100;
n is an integer from 2 to 100; and
i is an integer from 1 to n.

8. The process according to claim 1, wherein the at least one polyisocyanate a) is selected from the group consisting of tolylene diisocyanate, diphenylmethane diisocyanate and a mixture of diphenylmethane diisocyanate and a poly-methylenepolyphenylene polyisocyanate.

9. A flexible polyurethane foam which is produced by the process according to claim 1.

10. A flexible slabstock foam comprising the polyurethane foam according to claim 9.

11. A method, comprising adhering a textile to a polyurethane foam according to claim 9.

12. At least one of a motor vehicle interior, furniture, a mattress, a cushion, a sponge, clothing and a shoe comprising the flexible polyurethane foam according to claim 10.

13. The process according to claim 1, wherein said reacting the at least one alkylene oxide and carbon dioxide with the starter compound in the presence of the DMC catalyst is carried out at a temperature of from 60 to 150° C. and at a pressure of from 0-20 bar.

14. The process according to claim 1, wherein said reacting the at least one alkylene oxide and carbon dioxide with the starter compound in the presence of the DMC catalyst is carried out at a temperature of from 80 to 130° C. and at a pressure of from 3-10 bar.

15. The process according to claim 1, wherein said at least one alkylene oxide comprises at least one member selected from the group consisting of ethylene oxide; propylene oxide; 1-butene oxide; 2,3-butene oxide; 2-methyl-1,2-propene oxide ; 1-pentene oxide; 2,3-pentene oxide; 2-methyl-1,2-butene oxide; 3-methyl-1,2-butene oxide; 1-hexene oxide; 2,3-hexene oxide; 3,4-hexene oxide; 2-methyl-1,2-pentene oxide; 4-methyl-1,2-pentene oxide; 2-ethyl-1,2-butene oxide; 1-heptene oxide; 1-octene oxide; 1-nonene oxide; 1-decene oxide; 1-undecene oxide; 1-dodecene oxide; 4-methyl-1,2-pentene oxide; butadiene monoxide; isoprene monoxide; cyclopentene oxide; cyclohexene oxide; cycloheptene oxide; cyclooctene oxide; styrene oxide; and methylstyrene oxide.

16. The process according to claim 1, wherein said at least one alkylene oxide comprises ethylene oxide.

17. The process according to claim 1, wherein said at least one alkylene oxide comprises propylene oxide.

18. The process according to claim 1, wherein said at least one alkylene oxide comprises ethylene oxide and propylene oxide.

19. The process according to claim 1, wherein said carbon dioxide is introduced in an amount of 0.1 to 20% during said introducing, relative to the total amount of said at least one alklyene oxide introduced by said introducing.

20. A process, comprising:
introducing at least one alkylene oxide via a stream and carbon dioxide via a stream into a reaction chamber comprising a starter compound and a DMC catalyst,
reacting the at least one alkylene oxide and carbon dioxide with the starter compound in the presence of the DMC catalyst during said introducing, and
terminating the carbon dioxide stream without terminating the at least one alkylene oxide stream, thereby obtaining at least one polyether carbonate polyol bi), and reacting
a) at least one polyisocyanate with
b) at least one compound having at least two hydrogen atoms which are reactive toward isocyanate groups and comprising the at least one polyether carbonate polyol bi) in the presence of
c) at least one blowing agent,
wherein the at least one polyether carbonate polyol bi) has
a functionality of at least 2,
a hydroxyl number of from 10 to 500 mg KOH/g,
a content of carbon dioxide incorporated therein of at least 2% by weight, and
a block of pure alkylene oxide units at the end of the polyether carbonate polyol chain.

* * * * *